United States Patent
Reccek, Jr. et al.

(10) Patent No.: US 9,672,522 B2
(45) Date of Patent: Jun. 6, 2017

(54) SYSTEM AND METHOD FOR CAPTURING AND TRANSFERRING INFORMATION ONTO A GAS CYLINDER USING A QR CODE

(71) Applicant: Airgas, Inc., Cheshire, CT (US)

(72) Inventors: Anthony W. Reccek, Jr., Corinth, TX (US); Denver J. Curtis, Charleston, WV (US); Anand V. Shah, Delran, NJ (US)

(73) Assignee: AIRGAS, INC., Cheshire, CT (US)

( * ) Notice: Subject to any disclaimer, the term of this patent is extended or adjusted under 35 U.S.C. 154(b) by 0 days.

(21) Appl. No.: 14/851,490

(22) Filed: Sep. 11, 2015

(65) Prior Publication Data

US 2016/0078334 A1    Mar. 17, 2016

Related U.S. Application Data

(60) Provisional application No. 62/050,433, filed on Sep. 15, 2014.

(51) Int. Cl.

| | |
|---|---|
| *F17C 13/00* | (2006.01) |
| *G06Q 30/00* | (2012.01) |
| *G06K 19/06* | (2006.01) |
| *G06Q 10/06* | (2012.01) |
| *G06K 15/00* | (2006.01) |
| *G06Q 10/08* | (2012.01) |
| *G06K 7/14* | (2006.01) |

(Continued)

(52) U.S. Cl.
CPC .......... *G06Q 30/018* (2013.01); *F17C 13/003* (2013.01); *F17C 2205/05* (2013.01); *F17C 2205/054* (2013.01); *F17C 2205/058* (2013.01); *G06K 7/10722* (2013.01); *G06K 7/1417* (2013.01); *G06K 15/00* (2013.01); *G06K 19/06037* (2013.01); *G06Q 10/06* (2013.01); *G06Q 10/087* (2013.01); *G06Q 10/0833* (2013.01); *G06Q 20/203* (2013.01)

(58) Field of Classification Search
CPC ...... F17C 13/003; G06Q 10/087; G06Q 10/08
See application file for complete search history.

(56) References Cited

U.S. PATENT DOCUMENTS

| | | | | |
|---|---|---|---|---|
| 4,827,643 | A | * | 5/1989 | Hearst .................. B65D 25/205 206/509 |
| 5,953,682 | A | * | 9/1999 | McCarrick ............ F17C 13/003 235/375 |

(Continued)

*Primary Examiner* — Christopher Stanford
(74) *Attorney, Agent, or Firm* — RatnerPrestia

(57) ABSTRACT

The present invention generates and places a Quick Response (QR) matrix barcode on a Certificate of Analysis (COA) and/or label placed on a gas cylinder at a vendor's facility. The gas cylinder is then delivered to a customer. The customer can download onto his/her mobile device an Application from the vendor, by way of a communications network. Using the Application, the QR code can be scanned, decoded, and viewed by the customer. The customer can also download the decoded information into a database, or upload the same information to a third party's database. The information remains accurate, starting at the vendor's facility, arriving at the customer's facility and, finally, reaching the third party's facility. The information is securely transferred, without any possibility of making a mistake in the information transfer.

11 Claims, 11 Drawing Sheets

(51) Int. Cl.
  *G06K 7/10* (2006.01)
  *G06Q 20/20* (2012.01)

(56) References Cited

U.S. PATENT DOCUMENTS

| | | | |
|---|---|---|---|
| 2002/0023022 A1* | 2/2002 | Miyashita | F17C 13/003 705/26.1 |
| 2003/0066896 A1* | 4/2003 | Pettersson | G06K 7/10722 235/494 |
| 2003/0069795 A1* | 4/2003 | Boyd | G06Q 10/087 705/22 |
| 2006/0163357 A1* | 7/2006 | Kim | G06K 7/0163 235/462.1 |
| 2010/0004772 A1* | 1/2010 | Elfstrom | G06Q 10/06 700/103 |
| 2010/0065146 A1* | 3/2010 | Plummer | F17C 13/003 141/2 |
| 2011/0140850 A1* | 6/2011 | Wassel | F17C 13/021 340/8.1 |
| 2013/0043301 A1* | 2/2013 | Cola | F17C 1/06 235/375 |
| 2015/0107679 A1* | 4/2015 | Downie | G05D 11/137 137/7 |

* cited by examiner

CERTIFICATE OF ANALYSIS

Grade of Product: EPA Protocol

Airgas, Inc.
600 Union Landing Road
Cinnaminson, NJ 08077
856-829-7878 Fax :856-829-6576
www.airgas.com

| | | | |
|---|---|---|---|
| Part Number: | E03NI94E15A0452 | Reference Number: | 122-124392338-3 |
| Cylinder Number: | CC323677 | Cylinder Volume: | 146.9 CF |
| Laboratory: | ASG – Durham – NC | Cylinder Pressure: | 2015 PSIG |
| PGVP Number: | B22013 | Valve Outlet: | 660 |
| Gas Code: | CO2,NO,NOX,BALN | Certification Date: | Sep. 10, 2013 |

Expiration Date: Sep 10, 2021

Certification performed in accordance with "EPA Traceability Protocol for Assay and Certification of Gaseous Calibration Standards (May 2012)" document EPA 500IR-12/531, using the assay procedures listed. Analytical Methodology does not require correction for analytical interference. This cylinder has a total analytical uncertainty as stated below with a confidence level of 95%. There are no significant impurities which affect the use of this calibration mixture. All concentrations are on a volume/volume basis unless otherwise noted.
Do Not Use This Cylinder below 100 psig i.e. 0.7 megapascals

ANALYTICAL RESULTS

| Compound | Requested Concentration | Actual Concentration | Protocol Method | Total Relative Uncertainty | Assay Dates |
|---|---|---|---|---|---|
| NOX | 125.0 PPM | 127.3 PPM | G1 | +/- 0.7% NIST Traceable | 09/03/2013 09/10/2013 |
| NITRIC OXIDE | 125.0 PPM | 127.0 PPM | G1 | +/- 0.7% NIST Traceable | 09/03/2013 09/10/2013 |
| CARBON OXIDE | 5.000% | 4.923% | G1 | +/- 0.9% NIST Traceable | 09/03/2013 |
| NITROGEM | Balance | | | | |

CALIBRATION STANDARDS

| Type | Lot ID | Cylinder No. | Concentration | Uncertainty | Expiration Date |
|---|---|---|---|---|---|
| NTRM | 11060514 | CC331273 | 101.2 PPM NITRIC OXIDE/NITROGEN | +/- 0.5% | Feb. 16, 2017 |
| PRM | PRM | 680179 | 10.01 PPM NITROGEN DIOXIDE/NITROGEN | +/- 2.5% | Feb. 14, 2012 |
| GMIS | GMIS | CC323701 | 4.761 PPM NITROGEN DIOXIDE/NITROGEN | +/- 2.5% | Sep. 17, 2015 |
| NTRM | 12061304 | CC359848 | 11.002% CARBON DIOXIDE/NITROGEN | +/- 0.6% | Jan. 11, 2018 |

The SRM, PRM, or RGM noted above is only in reference to the GMIS used in the assay and not part of the analysis

ANALYTICAL EQUIPMENT

| Instruments/Make/Model | Analytical Principle | Last Multipoint Calibration |
|---|---|---|
| Nicollet 6700 AHR080 1333 CO2 | FTIR | Aug 15, 2013 |
| Nicollet 6700 AHR080 1333 NO | FTIR | Aug 15, 2013 |
| Nicollet 6700 AHR080 1333 NO2 | FTIR | Aug 15, 2013 |

10

11

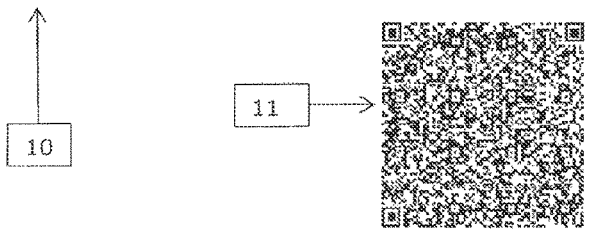

FIG. 1A

EPA PROTOCOL STANDARDS

Certified Concentrations

| Component | CAS Number | Concentration | Accuracy | Procedure |
|---|---|---|---|---|
| NOX | | 127.3 ppm | +/- 0.7% | G1 |
| NITRIC OXIDE | 10102-43-9 | 127.0 ppm | +/- 0.7% | G1 |
| CARBON DIOXIDE | 124-38-9 | 4.923% | +/- 0.9% | G1 |
| NITROGEN | 7727-37-9 | Balance | | |

Cylinder Numbers     CC323677

Cylinder Pressure:    2015 PSIG
Certification Date:    Sep 10, 2013
Expiration Date:    Sep 10, 2013
Reference Number:    122-124392338-3
Part Number:    E03NI94E15A0452
PGVP Number:    B22013
Gas Code:    C02,NO,NOX,BALN

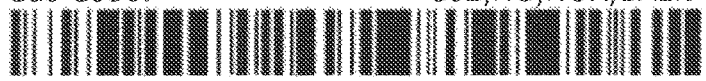

NOTES:
Do not use cylinder below 100 psig.

Certification performed in accordance with "EPA Traceability Protocol (May 2012)" using assay procedures listed.

To reorder this mixture, use Part Number E03NI94E15A0452
Empty Material:    MT-15ASG660
630 United Drive, Durham NC 27713

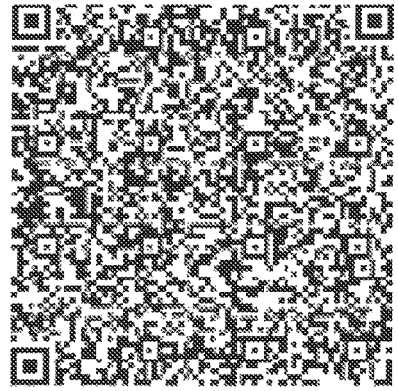

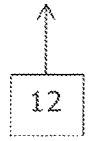

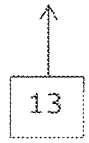

FIG. 1B

| | |
|---|---|
| Date Scanned | Aug 27, 2015, 11:41 AM |
| Grade of Product | EPA PROTOCOL STANDARD |
| Reference Number | 122-124392338-3 |
| Part Number | E03NI94E15A0452 |
| Cylinder Number | CC323677 |
| Laboratory | ASG – Durham – NC |
| PGVP Number | B22013 |
| Gas Code | CO2, NO, NOX, BALN |

FIG. 2C

| Word | Definition |
|---|---|
| (01) | Grade of Product |
| (02) | Reference Number |
| (03) | Part Number |
| (04) | Cylinder Number |
| (05) | Laboratory |
| (06) | PGVP Number |
| (07) | A2LA Certification No. |
| (08) | Gas Code |
| (09) | Cylinder Volume |
| (10) | Cylinder Pressure |
| (11) | Valve Outlet |

FIG. 6

SYSTEM AND METHOD FOR CAPTURING AND TRANSFERRING INFORMATION ONTO A GAS CYLINDER USING A QR CODE

This application claims priority to U.S. Provisional Application Ser. No. 62/050,433 entitled SYSTEM AND METHOD FOR CAPTURING AND TRANSFERRING INFORMATION ONTO A GAS CYLINDER USING A QR CODE filed on Sep. 15, 2014, the contents of which is incorporated fully herein by reference.

FIELD OF THE INVENTION

The present invention relates, in general, to generating and decoding two dimensional (2D) barcodes, or matrix barcodes. More specifically, the present invention relates to generating and placing a Quick Response (QR) matrix barcode by a vendor on a gas cylinder, in which the QR code can be scanned, viewed and transferred by a customer to record accurate information on the gas mixture in the cylinder. The information is securely transferred, without the possibility of making a mistake in the data transfer.

BACKGROUND OF THE INVENTION

Barcodes provide a convenient way to convey electronic information through a variety of electronic devices. A barcode is an optical machine-readable representation of data which, for example, shows data about the object to which it is attached. Traditionally, barcodes have represented data by varying the widths and spacing of parallel dark lines; these barcodes are often referred to as linear or one-dimensional (1D) barcodes. One-dimensional barcodes are scanned in a one-dimensional fashion by special-purpose optical scanning devices that are able to decode the information encoded in the barcodes; decoding of the information may be performed by measuring the widths and spacing of the parallel barcode lines through reflective light feedback.

One-dimensional barcodes, however, are very limited in the amount of information that can be encoded in the widths and spacing of the parallel barcode lines. Because of this limitation, there has been growth in the usage of two-dimensional (2D) barcodes, or matrix barcodes. One example of the type of matrix barcode that has enjoyed popular usage is the Quick Response (QR) code. Various versions of QR codes are capable of storing many bytes of data, when encoding binary data.

Once common use of QR codes has been to encode Uniform Resource Locators (URLs), such as website addresses. Such QR codes are often placed on billboards or mailers to provide consumers with a quick and easy way to visit a company's website, without having to memorize, write down, or manually type a URL into a smartphone or other mobile device. Consumers who see a QR code displayed may take a picture of the QR code, using a camera embedded in the smartphone, and may utilize a smartphone Application to automatically translate the QR code into a URL; the smartphone Application may then launch a browser pointed to the URL.

Turning now to gas cylinders, a tag or label is typically placed on the cylinder to identify the gas product in the cylinder. The tag or label, generally, includes much information, such as the gas cylinder product identification number, the date the gas cylinder was filled, the type of gas and mixture ratios in the cylinder, the quality of gas in the cylinder, the date the gas cylinder was tested, and so on. Customers, typically, request a Certificate of Analysis (COA) that includes information that satisfies regulatory requirements, such as EPA protocol standards. Since the COA includes a variety of data, errors are often made by customers, upon receiving the gas cylinders, as they transcribe the variety of data into various reporting systems, or databases. In general, transcribing and re-keying the cylinder data prompts errors, and causes excessive administrative time for simply shifting data from one program, or storage location to another.

As will be described, the present invention provides a system and method to capture and transfer pertinent information onto a gas cylinder using a QR code. In addition, the present invention provides a system and method to shift the pertinent information to a customer's database, or to a third party, without any transcription errors.

BRIEF DESCRIPTION OF THE FIGURES

The invention is best understood from the following detailed description when read in connection with the accompanying drawing. Included in the drawing are the following figures:

FIG. 1A is an example of a Certificate of Analysis including a QR code, placed on a gas cylinder by a vendor.

FIG. 1B is an example of a label including a QR code, placed on a gas cylinder by a vendor.

FIG. 2C is an example of a screen shot on a mobile device, depicting a third feature, namely, a viewing feature provided by the Application downloaded into the mobile device by the customer. The viewing feature allows the customer to view the recorded information in a tabular and comprehensive format.

FIG. 6 is an example of 2 digit codes used by the present invention to represent various definitions relevant to gas mixtures that may be inserted into a cylinder shipped to the customer.

It is understood that the foregoing general description and the following detailed description are exemplary, but are not restrictive, of the invention.

DETAILED DESCRIPTION OF THE INVENTION

The present invention provides a system and method for coding gas cylinder information onto a QR coded matrix barcode. The QR code is printed on the bottom right of a Certificate of Analysis (COA) and a cylinder label, as shown in FIGS. 1A and 1B. FIG. 1A shows an example of a COA 10 with a QR code 11 printed on the bottom right. FIG. 1B shows another example of a cylinder label 12 with another QR code 13 printed on the bottom right.

The QR code includes relevant gas cylinder information. Such information encompasses regulatory requirements, such as an EPA Protocol Standard, Traceability Standard, CEM, Certified, Primary, Precision blend, Nuclear Counter and ECD/Nuclear Counter mixes containing up to 13 components. The embedded data in the QR code can be scanned, viewed and emailed via CSV/Excel, RTF/Word or PDF platforms. Customers can simply transfer all data in order to satisfy requirements for programs, such as PGVP (Protocol Gas Verification Program), and local record archives.

Below is an example of a listing of data embedded into a QR code from a Certificate of Analysis. Embedded categories are determined by Grade of Product. (For example, a certified mix does not contain an A2LA Certification Number, because this is associated with EPA mixes only.)
Grade of Product
Reference Number
Part Number
Cylinder Number
Laboratory
PGVP Number
A2LA Certification Number
Gas Code
Cylinder Volume
Cylinder Pressure
Valve Outlet
Certification Date
Expiration Date
Components(s)
Requested Concentration(s)
Actual Concentration(s)
Protocol Method
Total Relative Uncertainty The present invention provides QR codes on a Certificate of Analysis and a cylinder label, which is placed by a vendor; and allows a customer receiving the gas cylinder to scan the code using an Application that may be downloaded for use on the customer's mobile device.

As will be described, the customer may scan, record, view and then transfer all data embedded in the QR code via the aforementioned CSV/Excel, RTF/Word or PDF platforms. The Application only scans the QR code prepared and coded by the vendor of the gas cylinder, and no other QR reader can scan the QR code. In this manner, security of the information contained in the QR code is maintained.

Figure 2A:
FIG. 2A is an example of a screen shot on a mobile device, depicting a first feature, namely, a scanning feature provided by an Application downloaded into the mobile device by a customer. The scanning feature allows the customer to image the QR code.
Figure 2B:
FIG. 2B is an example of a screen shot on a mobile device, depicting a second feature, namely, a recoding feature provided by the Application downloaded into the mobile device by the customer. The recording feature allows the customer to record the information into the customer's own database after decoding the QR code.
Figure 2D:
FIG. 2D is an example of a screen shot on a mobile device, depicting a fourth feature, namely, a sending feature provided by the Application downloaded into the mobile device by the customer. The sending feature allows the customer to send the recorded information to another party by email, for example.

The next set of figures depict views of the Application's functional features provided to a customer on his/her mobile device. As shown, FIG. 2A provides a first function of the Application to the customer to begin scanning of the QR code placed upon the COA or the gas cylinder label. The customer taps the screen of the mobile device and the mobile device begins scanning and digitizing the QR code. When the scanning and digitizing of the QR code is completed, a second function of the Application is provided to the customer, as shown in FIG. 2B. The screen shot shown in FIG. 2B alerts the customer that scanning of the QR code has been completed and the digitized code is now recorded in a memory of the mobile device. A third function of the Application allows the customer to view all the data decoded from the QR code in a tabular format that is presented on the screen of the mobile device, as shown in FIG. 2C. A fourth function of the Application is shown in FIG. 2D, which allows the customer to send as an email the decoded information from the QR code to a third party, or to another database for storage. The Application may be configured to enable the customer to decode the encoded description and send the decoded description to the storage system without modification. In this manner, the customer has complete control of the data and can securely and accurately transmit the data as an attachment to an email message. There is no need to grant additional access or provide permission to a third party for data entry.

The present invention, by way of the Application, provides a system and method to successfully process and decode barcodes acquired via digital imaging techniques. The Application allows a customer to use a reader, e.g., a mobile device equipped with a digital camera as a scanner of barcodes (one-dimensional and two-dimensional barcodes) or any other similar machine-readable code. In one embodiment, the mobile device is a cellular phone having a digital camera. In another embodiment, the mobile device is a tablet having a digital camera. In yet a further embodiment, the mobile device is a laptop computer having a digital camera. The Application seamlessly integrates the barcode scanning technology with the digital camera of the mobile device.

To utilize the Application software, a customer (or user) downloads the Application onto his/her mobile device through wired, or wireless access protocol. Once the customer has downloaded the Application, the customer launches the Application on his/her mobile device, e.g., a cellular phone, a tablet, a laptop computer, etc. This causes the software of the Application to properly initialize the digital camera coupled to the mobile device, and to accept digitized signals formed by the imager of the mobile device. The Application enables the digital camera, when the customer taps the screen of the mobile device.

The customer then takes an image of the barcode using the digital camera. As soon as the barcode is captured, the software of the Application decodes the barcode utilizing a decoding engine in the software. It will be appreciated that the location of the decoding process depends upon the processing capabilities of the mobile device. Thus, it is assumed that the Application software is operating on a smart mobile device, e.g., a cellular phone, a tablet, a laptop computer, etc., with adequate system capabilities.

Figure 3:
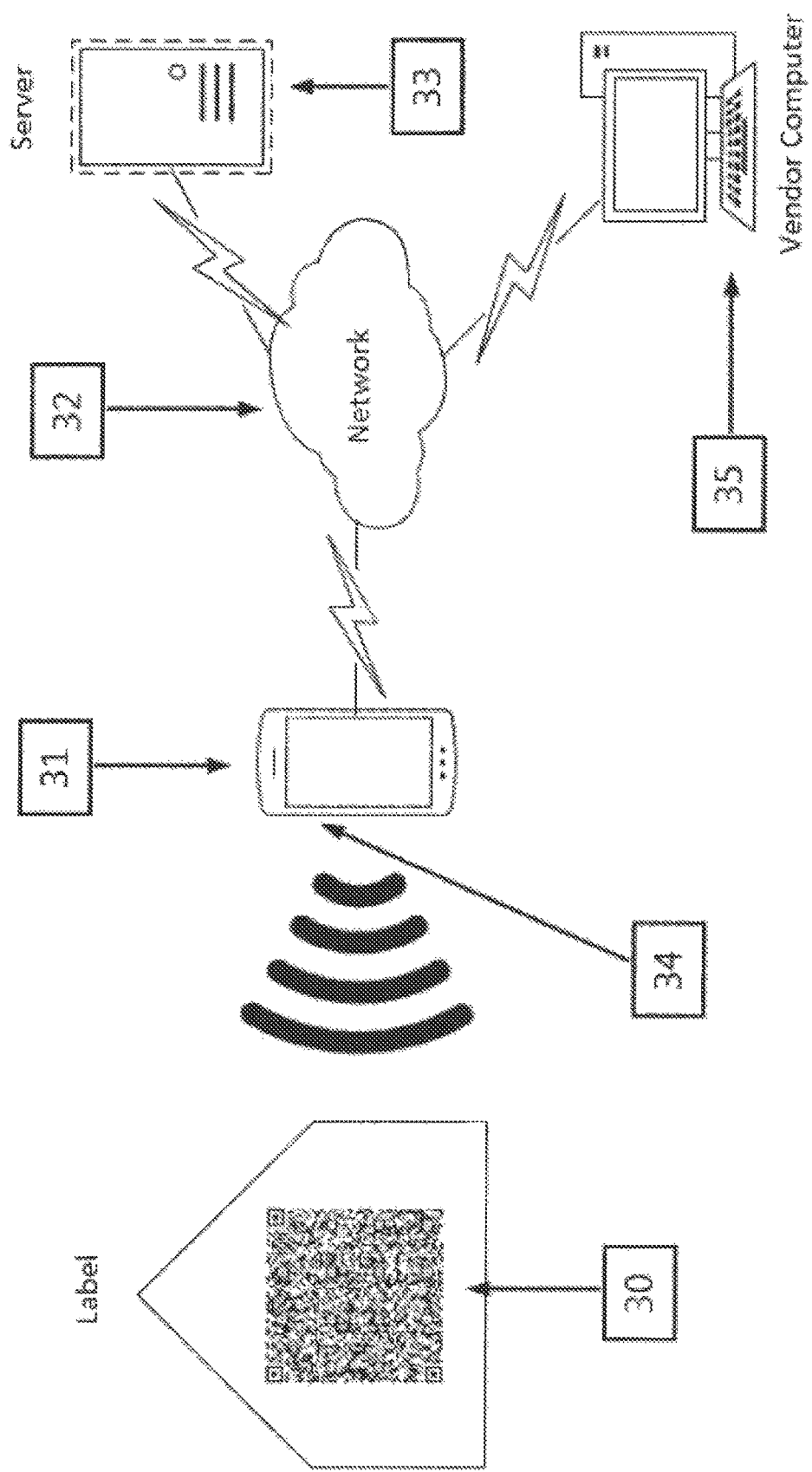
FIG. 3 is a functional block diagram of a mobile device communicating with a server and a vendor.

Referring now to FIG. 3, a block diagram of a system configuration is shown which may include the present invention. As shown, a customer scans the QR code 30, by using a reader, e.g., a mobile device 31 with attached or embedded digital camera 34. The customer launches the Application on mobile device 31. If the Application software has not yet been loaded into the reader, e.g., mobile device 31, a customer may do so by downloading the Application via a network, such as a wired, or wireless network 32. The Application may be downloaded to the reader to enable the reader to decode the encoded description. Once an image of QR code 30 has been taken by the reader, e.g., acquired by mobile device 31, the Application software loaded on the reader decodes the barcode directly utilizing the mobile device's internal circuitry. The Application may be configured to enable the reader to send the decoded description to a customer's storage system without modification. In one embodiment, the Application is configured to be downloaded to the reader to decode the encoded description and configured to send the decoded description to the storage system without modification.

Figure 4:
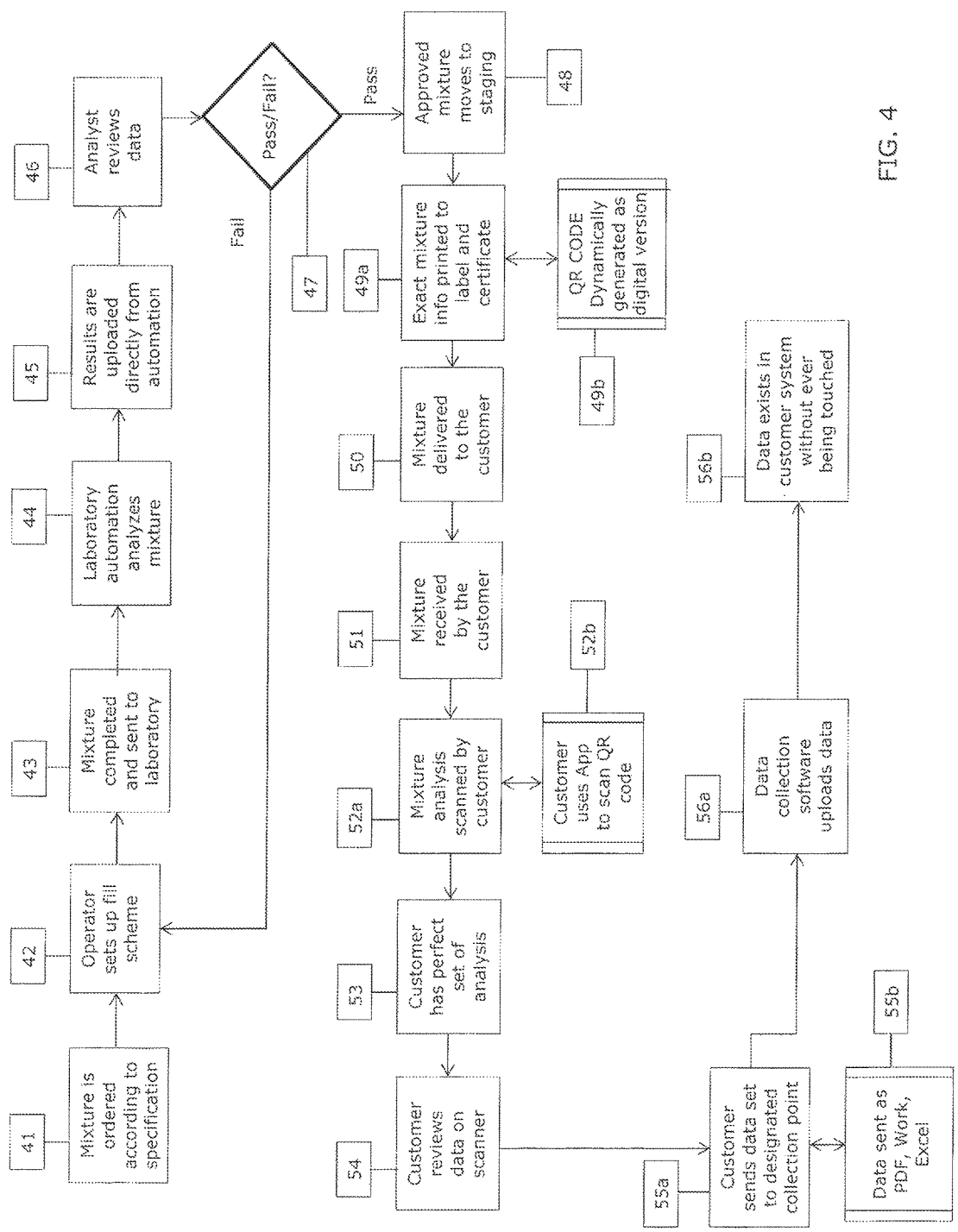
FIG. 4 is a flow diagram depicting an example of the present invention placing a QR coded matrix onto a gas cylinder and moving the gas cylinder to a customer, wherein the customer can scan, decode, view, store and transfer the information on the QR coded matrix to a third party, without transcription errors.

Referring next to FIG. 4, a process or method of the present invention is shown, that starts with step 41 and concludes with step 56. As shown, in step 41 a vendor receives an order of the gas mixture according to a specification provided by the customer. In step 42 the vendor sets the gas filling scheme, in accordance with the vendor's gas mixing procedures and at least one parameter set in the customer's specification. In step 43, the mixture is completed and sent to the laboratory for analysis and verification that the gas mixture in the cylinder is properly filled. In an automatic process performed in the laboratory, step 44 analyzes the mixture. The result of the analyses is uploaded directly from the automatic process, as shown by step 45. The result of the analysis is reviewed in step 46 to determine whether the gas mixture result passes or fails. The process then enters decision box 47. If the gas mixture is correctly and appropriately filled, then the process branches to step 48. If decision box 47 determines that the gas mixture is not correct and/or fails to satisfy the at least one parameter set in the customer's specification, on the other hand, then decision box 47 branches back to step 42 and again sets up the gas filling scheme.

Once the mixture in the gas cylinder is approved, step 48 in the process moves the cylinder to staging. At staging, step 49 prints the exact mixture onto the cylinder label and the Certificate of Analysis. All the information, noted previously, is also automatically coded into a QR code by step 49*a*. The QR coded matrix is placed on the COA and the cylinder label. The QR code is formed using compact digital representation of the data. By mapping all necessary words comprising the data onto the QR code, the present invention is able to print the entire code for a gas mixture with multiple component gases as a graphic image of only a 1.5" by 1.5" matrix; whereas the graphic image could be 3" by 3" or greater using conventional techniques. Step 50 of the process delivers the gas cylinder to the customer.

Step 51 of the process shows the customer receiving the gas cylinder. In step 52, the customer scans the QR code using his Application on the mobile device. The customer uses the Application, downloaded in step 52*a*, to scan the QR code in step 52. Due to the Application, the customer receives a perfect set of information including analysis data of the gas mixture that is sent from the vendor to the customer, as shown in step 53. The customer may now review the data as displayed on the mobile device using step 54. The customer may also transmit and transfer the same data to different collection points, as desired by step 55. The data may be sent as a WORD document, an EXCEL document, or a PDF document, as shown in step 55*a*. The customer can now upload the data from the mobile device to other locations by using step 56. The data now exists in the customer's database, or at a third party's database, without ever being touched by human hands, as shown in step 56*a*. For example, in one embodiment, the steps of developing the description by analyzing the gas, encoding the description, producing a two-dimensional code, decoding the encoded description, and storing the decoded description are performed without human intervention.

Figure 5:
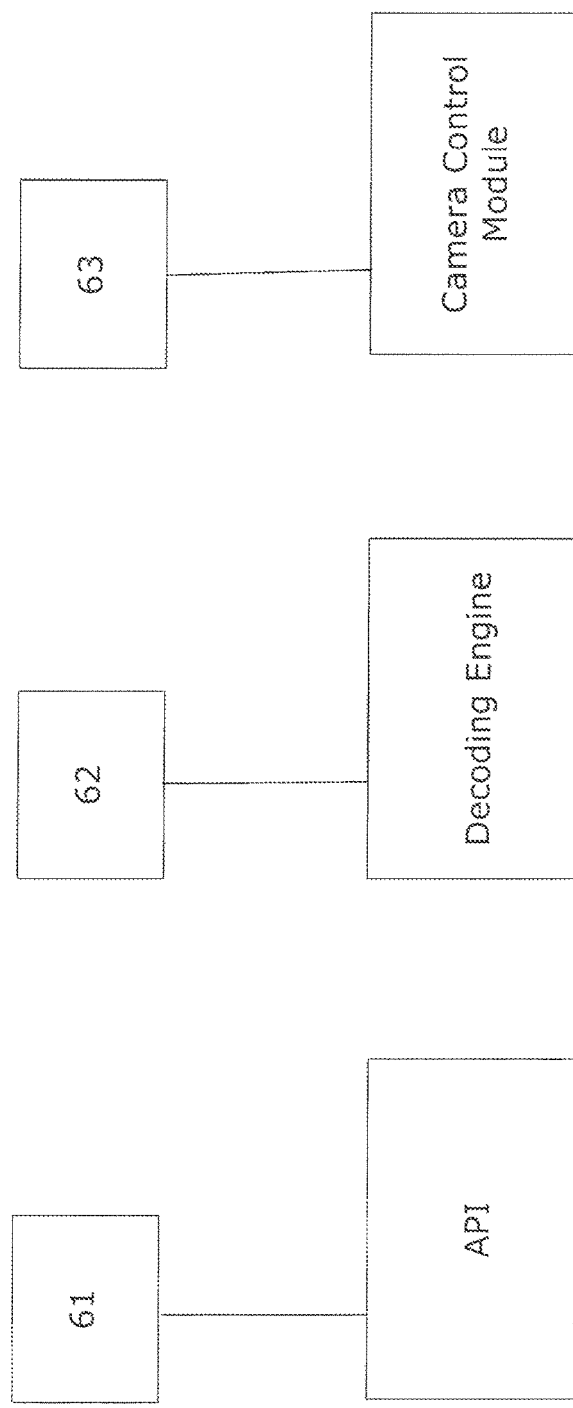
FIG. 5 is a block diagram depicting high level features of the Application downloaded from the vendor to the customer.

Turning next to FIG. 5, there is shown a block diagram depicting the architecture of the Application software. The software is composed of three main modules: the Application Program Interface (API) 61, decoding engine 62, and camera control module 63. The API 61 is the interface with which the customer utilizes to interact with the software. The API 61 guides the customer through the steps required to decode and process the QR code 30. The API first directs camera control module 63 to initialize the application for digital camera 34. This initializes digital camera 34 to accept input signals. Next, API 61 causes a viewfinder window to open on the mobile device display. This allows the customer to make sure that QR code 30 is in proper focus and sufficiently illuminated.

The customer is then directed to tap the display on mobile device 31 to take an image of QR code 30. Once the image of the QR code has been acquired and stored in memory, the image undergoes exposure control to compensate for the illumination.

At this point in the acquisition process, the acquired image is displayed to the customer for review. The processed image is then passed to decoding engine 62 for decoding of the QR code. If the decoding is not successful, API 61 alerts the customer so that a new image can be acquired by the imager. However, if decoding is successful, API 61 closes the shutter of the camera and clears the camera's memory.

Decoding engine 62 is able to decode the two-dimensional barcode 30 with a CIF (352×288) imager, or a VGA (640×480) imager. Increasing the imager resolution generally improves the decoding speed, and accuracy provided to the decoded image.

Once the image is properly decoded, the customer can download the decoded information to his/her own database or upload the decoded information to a third party's database. This is all accomplished without the customer having to spent time transcribing the information and without the customer possibly making any errors in the transcription.

It will be appreciated that a great deal of information, or data is coded in the QR coded matrix. This is accomplished by using text compression techniques. A master symbol dictionary is maintained by the vendor's database infrastructure. The symbol dictionary includes multiple 4 character symbols representing respective words. Each word represents an extended length translation text, referred to herein as a definition. An example of the words and their respective definitions is shown in FIG. 6. In this example, there are 12 words which are each represented by 4 characters (for example {01}), with each word corresponding to a respective definition.

The words and definitions are integrated into the vendor's Application, which is downloaded by the customer. This permits the string of words, or characters that have been stored in the QR coded matrix to be converted into readable English translation of the words. In this manner, the customer can generate an English text of the compressed QR coded matrix. The vendor places the coded data onto the QR coded matrix and the customer can scan, decode, read and view the decoded matrix in English. The customer can then email, or send the decoded data to any third party. All this is performed without any possibility of making transcription errors between the vendor, the customer and any third party.

The text stored in the QR code is also secure. When the text is generated by the vendor's proprietary gas production system (also referred to as PPM), the data is stored in long strings containing a series of words, as shown for example in FIG. 6. This string of words is followed by an alphanumeric string of actual data. The actual data is recorded by the vendor in the PPM, checked and verified, prior to coding the information onto the QR matrix. This actual data includes, but is not limited to, part number data, order preparation data, analytical data, various calendar dates, order notes, customer information, etc.

The Application downloaded by the customer only scans the QR codes that begin with a dictionary word, shown in FIG. 6, for example, {01}, {02}, {12}, etc. If someone other than the customer were to scan the QR matrix with a conventional QR scanner, the result would be worthless information that does not satisfy the numerous industry and government requirements for data compliance.

Figure 7:
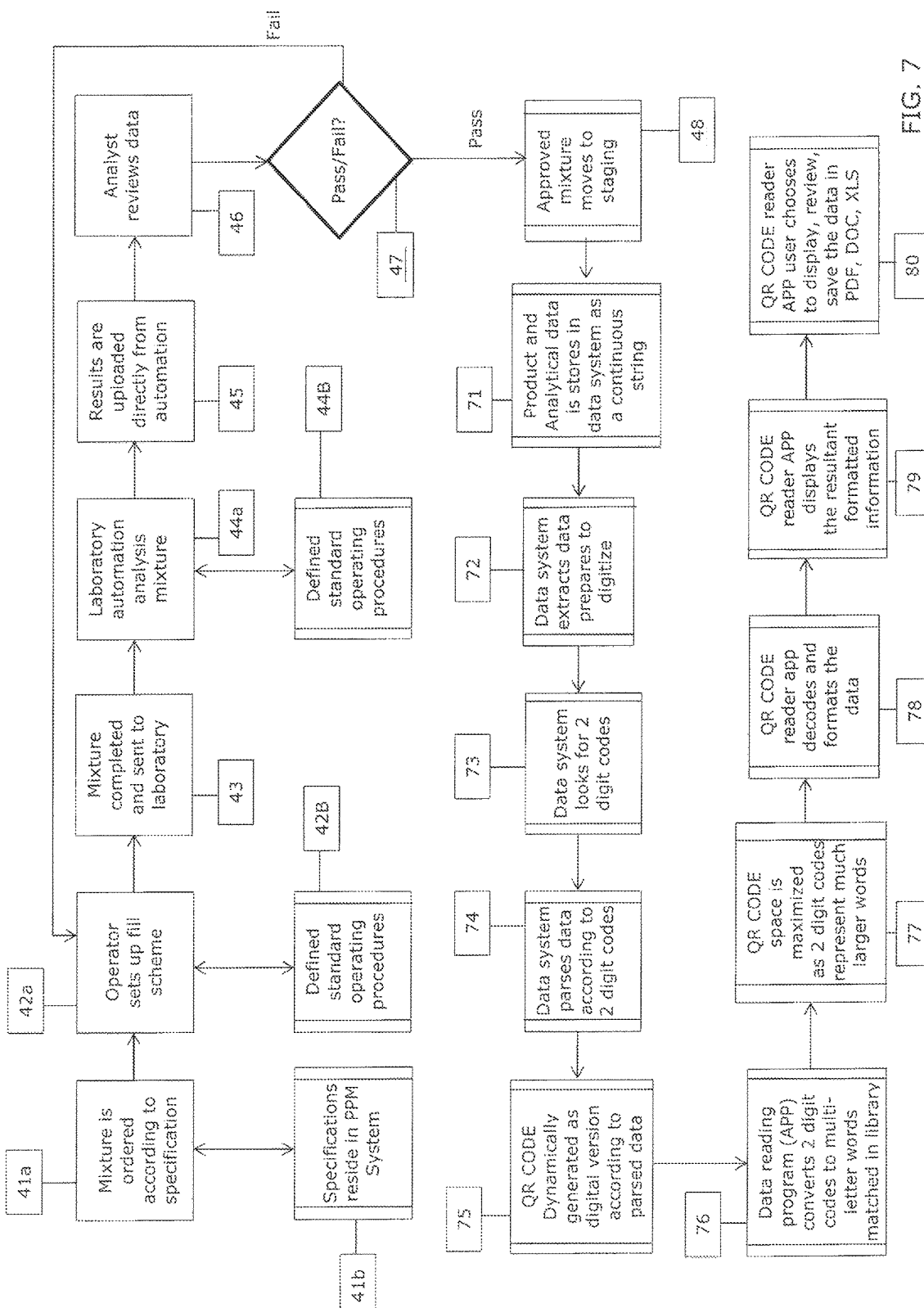
FIG. 7 is a flow diagram, somewhat different from FIG. 4, depicting an example of the present invention placing a QR coded matrix onto a gas cylinder and moving the gas cylinder to a customer, wherein the customer can scan, decode, view, store and transfer the information on the QR coded matrix to a third party, without transcription errors. Since the data is compressed with bits representing information, much data can be placed into the QR code and the data can only be read by a customer that has the specific Application for decompressing and translating the coded data.

Referring now to FIG. 7, a process or method of the present invention is shown, that starts with step 41 and concludes with step 80. It will be appreciated that steps 41 through 48 are described above with reference to FIG. 4 and a detailed description is not repeated here. The vendor prepares the mixtures based on various specifications (41*a*) residing in the PPM system (41*b*), various operating procedures (42*a*) defined in standard operation procedures (42*b*), and various analyzes of the mixtures (44*a*) defined in standard operating procedures (44*b*).

After the mixture has been approved, the gas cylinder moves to staging (step 48). The detailed information of the gas mixture and its associated analytical data is stored in the vendor's PPM database (step 71). The information is extracted from the PPM database (step 72) and compressed into a string of 2 digit codes (step 73). The system then parses the actual data according to the 2 digit codes (step 74), as described previously. This generates the QR code, which includes the 2 digit codes and the corresponding actual data (step 75). The QR code is placed on the label of the gas cylinder and the gas cylinder is shipped to the customer.

After the customer downloads the Application provided by the vendor, the customer scans and decodes the QR matrix. The data scanning and decoding software in the Application converts the 2 digit codes into multi-letter words that include the definitions established by the vendor (step 76). The QR code compression, thus, allows for much more English words and text that would normally be allowed in a conventional QR matrix (step 77). The Application reformats the data, so that the data is readily understood by the customer (step 78). The data is displayed on the reader, e.g., a mobile device, by the Application (step 79) and the customer may review the data, and send the same data to a third party (step 80). This may be done in PDF format, DOC format, or XLS format. Examples of displayed data and emailed data are shown in FIGS. 2C and 2D.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for transferring information regarding gas within a container, the method comprising the steps of: producing a filling scheme to fill a container with gas, the gas comprising at least one component; filling the container with the gas in accordance with the filling scheme; developing a description of the gas by analyzing the gas within the container, the description containing a certificate of analysis for the gas, including a name and an amount for each of the at least one components of the gas; encoding the description, the encoded description compressed using at least one representative identifier; printing a two-dimensional code containing the encoded description; affixing the two-dimensional code to the container at an origin facility; transporting the container from the origin facility to a destination facility; reading the two-dimensional code at the destination facility to obtain the encoded description; decoding the encoded description by converting the at least one representative identifier to an extended length translation text; and storing the decoded description.

2. The method of claim 1, further comprising: providing an application configured to be downloaded to a reader; the reader adapted to take an image of the two dimensional code; and the application configured to decode the encoded description based on the image of the two dimensional code taken by the reader.

3. The method of claim 2, wherein the reader is a cellular phone having a digital camera.

4. The method of claim 1, further comprising: comparing the description of the gas to the filling scheme; and refilling the container with gas according to at least one parameter set in a specification if the analyzed gas is not within the at least one parameter set in the filling scheme.

5. The method of claim 1, wherein the steps of developing the description by analyzing the gas, encoding the description, producing a two-dimensional code, decoding the encoded description, and storing the decoded description are performed without human intervention.

6. The method of claim 1, wherein the gas within the container is in a liquid phase or a gaseous phase.

7. The method of claim 2, wherein the application decodes the encoded description using the at least one representative identifier.

8. The method of claim 2, wherein the application is configured to enable a customer to decode the encoded description and to send the decoded description to a storage system of the customer without transcription errors.

9. The method of claim 2, wherein the decoded description is received by the destination facility without transcription errors.

10. The method of claim 1, wherein the two dimensional code has a length of 1.5 inches or less and a width of 1.5 inches or less.

11. The method for of claim 1, wherein the at least one representative identifier is formed of four character symbols.

* * * * *